(12) United States Patent
Mijumbi et al.

(10) Patent No.: US 11,228,503 B2
(45) Date of Patent: Jan. 18, 2022

(54) METHODS AND SYSTEMS FOR GENERATION AND ADAPTATION OF NETWORK BASELINES

(71) Applicant: Nokia Solutions and Networks Oy, Espoo (FI)

(72) Inventors: Rashid Mijumbi, Hollywell Heights (IE); Abhaya Asthana, Framingham, MA (US); Markku Koivunen, Espoo (FI); Haiyong Fu, Shanghei (CN); Qinjun Zhu, Sichuan (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/770,701

(22) PCT Filed: Dec. 8, 2017

(86) PCT No.: PCT/CN2017/115234
§ 371 (c)(1),
(2) Date: Jun. 8, 2020

(87) PCT Pub. No.: WO2019/109338
PCT Pub. Date: Jun. 13, 2019

(65) Prior Publication Data
US 2021/0168042 A1    Jun. 3, 2021

(51) Int. Cl.
*H04L 12/24* (2006.01)
*H04L 12/26* (2006.01)

(52) U.S. Cl.
CPC .......... *H04L 41/145* (2013.01); *H04L 41/147* (2013.01); *H04L 43/04* (2013.01); *H04L 43/067* (2013.01); *H04L 43/08* (2013.01)

(58) Field of Classification Search
CPC ..... H04L 41/145; H04L 41/147; H04L 43/04; H04L 43/067; H04L 43/08
See application file for complete search history.

(56) References Cited

U.S. PATENT DOCUMENTS 6,453,265 B1    9/2002  Dekhil et al.
6,597,777 B1 *  7/2003  Ho ...................... H04L 41/0896
                                                370/235
(Continued)

FOREIGN PATENT DOCUMENTS

CN    101267362 A    9/2008
CN    105493514 A    4/2016
(Continued)

OTHER PUBLICATIONS

S. Kuwabara, et al., "Adaptive Network Monitoring System for Large-volume Streaming Services in Multi-domain Networks," in 2012 World Telecommunications Congress, Mar. 2012, pp. 1-6.
(Continued)

*Primary Examiner* — Viet D Vu
(74) *Attorney, Agent, or Firm* — Tong, Rea, Bentley & Kim, LLC (57) ABSTRACT

Systems, methods, apparatuses, and computer program products for the generation and adaptation of network baselines are provided. One method may include generating predicted values for one or more network metrics over a future time period, generating a baseline for the network metric(s) using the predicted values and/or historic data, evaluating the network metric(s) to detect changes in network conditions using at least one time series analysis technique, and adapting the baseline to the detected changes in network conditions using historic data, machine learning and/or a time series analysis technique.

16 Claims, 5 Drawing Sheets

(56) References Cited

U.S. PATENT DOCUMENTS

| | | | |
|---|---|---|---|
| 6,611,726 | B1 | 8/2003 | Crosswhite |
| 2004/0148139 | A1* | 7/2004 | Nguyen .............. G05B 23/0221 702/189 |
| 2011/0161048 | A1 | 6/2011 | Sodem et al. |
| 2013/0024173 | A1 | 1/2013 | Brzezicki et al. |
| 2014/0047096 | A1* | 2/2014 | Kupershmidt .......... G06F 11/34 709/224 |
| 2014/0180635 | A1 | 6/2014 | Yaakov et al. |
| 2014/0278804 | A1* | 9/2014 | Lanxner .............. G06Q 30/0206 705/7.35 |
| 2014/0343891 | A1* | 11/2014 | Becker .................... G08G 1/04 702/150 |
| 2017/0364614 | A1* | 12/2017 | Freeman ................. G06F 30/20 |
| 2019/0007285 | A1* | 1/2019 | Nevo ....................... H04L 43/08 |
| 2019/0129959 | A1* | 5/2019 | Jagwani ................ G06F 16/217 |

FOREIGN PATENT DOCUMENTS

| | | |
|---|---|---|
| WO | WO 2015-031751 A1 | 3/2015 |
| WO | WO 2017/190808 A1 | 11/2017 |

OTHER PUBLICATIONS

F. Dressler et al., "Flexible Flow Aggregation for Adaptive Network Monitoring," in Proceedings of 2006 31st IEEE Conference on Local Computer Networks, Nov. 2006, pp. 702-709.

R. Mijumbi, et al., "Topology-aware Prediction of Virtual Network Function Resource Requirements," IEEE Transactions on Network and Service Management, vol. 14, No. 1, pp. 106-120, Mar. 2017.

F. Dressier et al., "Simulative Analysis of Adaptive Network Monitoring Methodologies for Attack Detection," in Eurocon 2005, International Conference on "Computer as a Tool," vol. 1, Nov. 2005, pp. 624-627.

R. Mijumbi, et al., "Management and Orchestration Challenges in Network Function Virtualization," IEEE Communications Magazine, vol. 54, Issue 1, Jan. 2016, p. 98-105.

R. Mijumbi, et al., "Contributions to Efficient Resource Management in Virtual Networks," AIMS2014Paper, downloaded from http://www.maps.upc.edu/rashid/files/AIMS2014PAPER.pdf, 5 pages.

J. M. A. Calero et al., "MonPaaS: An Adaptive Monitoring Platform as a Service for Cloud Computing Infrastructures and Services," IEEE Transactions on Services Computing, vol. 8, No. 1, Jan. 2015, pp. 65-78.

B. L. Smith et al., "Traffic Flow Forecasting: Comparison of Modeling Approaches," Journal of Transportation Engineering, vol. 123, No. 4, Jul. 1997, pp. 261-266.

Y. Sandoval, et al., "Evaluation of Monitoring Tools for Cloud Computing Environments," in 2012 XXXVIII Conferencia Latinoamericana En Informatica (CLEI), Oct. 2012, pp. 1-10.

Z. Zhao, et al., "LSTM network: a deep learning approach for short-term traffic forecast," Institute of Engineering and Technology (IET) Intelligent Transport Systems, vol. 11, Issue 2, Feb. 2017, 16 pages.

C. Liu, et al., "Online ARIMA Algorithms for Time Series Prediction," Proceedings of the Thirtieth AAAI Conference on Artificial Intelligence, AAI-16, Feb. 2016, 7 pages.

Y. Wei, et al., "Forecasting the short-term metro passenger flow with empirical mode decomposition and neural networks," Transportation Research Part C 21, vol. 21, Issue 1, Apr. 2012, pp. 148-162.

F. Petitjean, et al., "Dynamic Time Warping Averaging of Time Series Allows Faster and More Accurate Classification," 2014 IEEE International Conference on Data Mining, Dec. 2014, pp. 470-479.

J. Scargle, "Studies in Astronomical Time Series Analysis. II—Statistical Aspects of Spectral Analysis of Unevenly Spaced Data," Astrophysical Journal, Part 1, vol. 263, Dec. 15, 1982, p. 835-853.

B. Carlin, et al., "Extending the Linear Model with R: Generalized Linear, Mixed Effects and Nonparametric Regression Model," Chapter 11, Taylor & Francis Group, 2006, 345 pages.

W. Fang, Zet al., "A New Dynamic Network Monitoring Based on IA," 2008 International Symposium on Computer Science and Computational Technology, vol. 2, Dec. 2008, pp. 637-640.

ITU, "Teletraffic Engineering Handbook—Chapter 2," ITU-D SG 2/16 & ITC, Jun. 2001, 21 pages.

Mijumbi, "Self-managed Resources in Network Virtualization Environments," Universitat Politecnica de Catalunya Barcelonatech, Barcelona, Sep. 2014, , Jun. 2001, 237 pages.

Hochreiter, "Long Short-Term Memory," Massachusetts Institute of Technology, Neural Composition 9, 1997, pp. 1735-1780.

Diebold et al., "Time Series Analysis," PIER Working Paper 06-019, Penn Institute for Economic Research, May 2006, 24 pages.

* cited by examiner

METHODS AND SYSTEMS FOR GENERATION AND ADAPTATION OF NETWORK BASELINES

CROSS-REFERENCE TO RELATED APPLICATIONS

The present application is a 371 application of PCT Patent Application Serial No. PCT/CN2017/115234, entitled "METHODS AND SYSTEMS FOR GENERATION AND ADAPTATION OF NETWORK BASELINES" and filed on Dec. 8, 2017, the entirety of which is incorporated by reference herein.

BACKGROUND

Field

Certain embodiments may generally relate to wired or wireless communication networks including, but not limited to, local area networks or wide area networks, such as the Internet. For instance, some embodiments may generally relate to wireless or cellular communications systems, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or $5^{th}$ generation (5G) radio access technology or new radio (NR) access technology. For example, various embodiments may relate to the generation and adaptation of network baselines for such communication networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

Fifth generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the Node B or eNB may be referred to as a next generation or 5G Node B (gNB).

The evolution towards 5G of communication systems will make networks bigger and more complex. In addition, 5G networks are expected to support a diverse variety of verticals, such as smart grid, smart cities, connected automotive, eHealth, etc., making communications systems more integral and critical components of society than current systems. As a result, ensuring high reliability and availability for such societal-critical infrastructure will be vital. Moreover, in order to support the performance requirements needed to deliver the expected data rates, networks must be operated and managed efficiently.

SUMMARY

One embodiment is directed to a method, which may include generating predicted values for at least one network metric over a future time period. The generating may include using at least one of historic data, a machine learning or time series analysis technique, to generate the predicted values. The method may also include generating a baseline for the at least one network metric using at least one of the predicted values or the historic data, evaluating the at least one network metric to detect changes in network conditions using the at least one time series analysis technique, and adapting the baseline to the detected changes in network conditions using the at least one of historic data, machine learning or time series analysis technique.

In an embodiment, the method may further include determining a variability from the predicted values of the at least one network metric over the future time period using the at least one time series analysis technique. In certain embodiments, the adapting of the baseline may include periodically determining a trend for the at least one network metric and modifying the baseline when a change in the trend is detected.

According to some embodiments, the baseline may be comprised of an upper limit and a lower limit, and the method may further include comparing a currently observed value of the at least one network metric with the baseline and detecting a breach when the currently observed value of the at least one network metric is above the upper limit of the baseline or below the lower limit of the baseline.

In certain embodiments, the method may include storing each past detected breach of the baseline as a record in a knowledge base, where each record in the knowledge base may include a time period when the breach occurred, a duration of the breach, and/or a maximum magnitude of the breach. According to one embodiment, when a breach is detected, the method may include checking the knowledge base to determine whether there is a similar breach to the detected breach that is stored in the knowledge base. When no similar breach is found in the knowledge base, the method may include generating an alarm and creating a record in the knowledge base for the detected breach. When a similar breach is found in the knowledge base, the method may include monitoring the at least one network metric that caused the breach for adherence to the record of the similar breach to confirm that the detected breach does not represent an anomaly in the network.

According to some embodiments, when an alarm is generated, the method may further include sending the alarm to a network administrator, receiving a response indicating whether the breach that triggered the alarm represents an anomaly in the network, and updating the knowledge base to store the response in the record of the breach. In one embodiment, the method may also include assigning the at least one network metric to a cluster according to an alignment between metrics, and grouping records in the knowledge base based on the cluster.

In an embodiment, the method may include storing the predicted values in memory for use with future predictions of the at least one network metric. In certain embodiments, the generating of the predicted values may include periodically generating the predicted values, and the evaluating of the at least one network metric may further include continuously evaluating the at least one network metric to detect changes in the network conditions.

Another embodiment is directed to an apparatus that may include generating means for generating predicted values for at least one network metric over a future time period. The generating means may include means for using at least one of historic data, a machine learning or time series analysis technique, to generate the predicted values. The apparatus may also include generating means for generating a baseline for the at least one network metric using at least one of the predicted values or the historic data, evaluating means for evaluating the at least one network metric to detect changes in network conditions using the at least one time series analysis technique, and adapting means for adapting the baseline to the detected changes in network conditions using the at least one of historic data, machine learning or time series analysis technique.

Another embodiment is directed to an apparatus that may include at least one processor and at least one memory comprising computer program code. The at least one memory and computer program code may be configured, with the at least one processor, to cause the apparatus at least to generate predicted values for at least one network metric over a future time period, for example, using at least one of historic data, a machine learning or time series analysis technique, to generate a baseline for the at least one network metric using at least one of the predicted values or the historic data, to evaluate the at least one network metric to detect changes in network conditions using the at least one time series analysis technique, and to adapt the baseline to the detected changes in network conditions using the at least one of historic data, machine learning or time series analysis technique.

Another embodiment is directed to computer program embodied on a non-transitory computer readable medium. The computer program, when executed by a processor, may cause the processor to perform a process including generating predicted values for at least one network metric over a future time period, for example, using at least one of historic data, a machine learning or time series analysis technique, generating a baseline for the at least one network metric using at least one of the predicted values or the historic data, evaluating the at least one network metric to detect changes in network conditions using the at least one time series analysis technique, and adapting the baseline to the detected changes in network conditions using the at least one of historic data, machine learning or time series analysis technique.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for the generation and adaptation of network baselines, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

Ensuring the necessary levels of reliability, availability, and operational efficiency requires the capability to monitor network systems in real-time. This may be necessary for detecting or predicting when network performance deviates from a set baseline so as to carry out preventive or corrective actions. State-of-the-art monitoring applications require a network administrator and/or expert to provide or determine network baselines that can be used as a basis for determining anomalous behavior. Network baselines may refer to, for example, network performance thresholds that can be used as a basis for determining anomalous network behaviour. In other words, when network performance deviates too far from the baseline, the network is considered to be behaving anomalously.

One of the biggest challenges faced in setting up a monitoring solution is the manual process of determining these network baselines. The process generally includes using historical data, i.e., monitoring the values of each metric (such as bandwidth, throughput, latency, attachment success rate, handover failure rate, CPU or memory usage, error rate, jitter, etc.) over a given time to determine observed maximum and/or minimum values which are then used as upper and/or lower baseline limits for the metric. However, the current approach for determining and setting the network baselines is static and non-scalable.

The effort required to determine and set such baselines for each monitored metric in a sizeable network is significant. As networks become more complex and require real-time actions, such actions require a significant amount of a network administrator's time. For this reason, network baselines are generally either only determined at network element installation and never adjusted (i.e., static), or in some cases the baselines are never determined for some metrics, but set using vendor default values (such as "the CPU utilization should not exceed 60%"), and are not changed throughout the lifetime of the element. This poses a risk for reliability and availability in case the baselines were set very high, and operation efficiency (in terms of low resource utilization and multiple false alarms) in case the values are set very low.

When the monitored value of a given metric deviates from a set baseline, a monitoring application usually raises an alarm that is responded to by a network administrator. Many alarms generated by a monitoring application are false alarms in that they are not necessarily indicative of an actual anomaly in system operation. As networks continue to increase in size and complexity to support an IoT, network administrators are no longer able to respond to every alarm generated by a monitoring application. This requires that either the number of monitored devices and/or metrics should be restricted, or the baselines must be set wide enough to reduce the number of false alarms per metric. However, both of these options are a threat to reliability, availability and operational efficiency. Accordingly, embodiments discussed herein provide a mechanism for a monitoring node or application to learn from generated alarms such that, over time, the number of false alarms can be reduced without negatively affecting reliability and efficiency.

Certain embodiments therefore are directed to a method and system for automatically generating and adapting network baselines to changes in network conditions, and for learning from historic baseline breaches to optimize the number of alarms and limit the load on network administrators. In one embodiment, a method and system for network baseline generation is provided in which data is collected from one or more network elements and metrics. For each metric, the collected data may be used by a machine learning or analytics algorithm to generate predicted values of the metric over a given future time period. According to an embodiment, a time series analysis technique may be used to determine the variability of the metric over the future time period. The predicted values and variability may then be used to generate the initial baselines (e.g., upper and lower limits) for the metric over a defined future period. In certain embodiments, this process may be applied or repeated for all metrics in the network.

As used herein, according to certain embodiments, network elements may be any logical or physical telecommunications entity. These may include physical and/or virtual network entities, such as radio network controllers, base stations, access points, serving gateways, mobility management entities, routers or switches, etc. For each element, embodiments may monitor and collect data on one or more metrics, such as bandwidth, throughput, latency, attachment success rate, handover failure rate, CPU or memory usage, error rate, jitter, etc. Assuming that the monitored network(s) are made up of E elements and M metrics across all elements, certain embodiments may obtain the value $x^t_{me}$ for metric $m \in M$ of element $e \in E$ at a time t. Over a period T, the collected data may be represented by the time series given in the following formula:

$$X = \{x^t_{me} \forall m \in M, e \in E, t \in T\}.$$

According to an embodiment, the lower and upper thresholds L and U of the baseline may be determined for a time period $T' \geq T$ according to the following formulas:

$$L = \{l^t_{me} \leq x^t_{me} \forall m \in M, e \in E, t \in T'\}$$

$$U = \{u^t_{me} \geq x^t_{me} \forall m \in M, e \in E, t \in T'\}$$

In one embodiment, T' may start at the end of T and last for one week (168 hours), for example. However, in other embodiments, the time period T' may be one hour, one day, multiple days or multiple weeks, or any other appropriate time period.

Additional embodiments may provide a method and system for periodically adapting the generated baseline(s) (i.e., the upper and lower thresholds) to changes in network conditions. To this end, for each metric, an embodiment may include periodically determining the general trend (e.g., up, down or flat) of the observed values of a metric over a past time period. The observed trend of a metric can be determined using one or more time series analysis methods, such as decomposition. In an embodiment, every determined trend may be stored and compared with a previously determined trend to establish if the general trend of observations has changed. According to certain embodiments, upon detecting a change in trend, the baseline generation method discussed above may be used to re-generate the baselines using the most recent metric observations.

Some embodiments may further include learning from baseline breaches. For example, one embodiment may further incorporate a method for learning from previously generated alarms to guide future alarm generation. According to this embodiment, several metrics that are similar (in terms of magnitude and characteristics of ebbs and flows) may be clustered. This metric clustering ensures that metrics in the same cluster are treated as one when generating alarms, and hence making sure that, for alarms that are considered similar, only one alarm is raised for all metrics in the cluster.

Further embodiments may provide a method and system for establishing whether a given alarm is similar to a previous alarm by incorporating a feedback loop from network administrators or experts to the monitoring system. According to this embodiment, whenever an alarm is generated, an expert may provide feedback to the system, for example in the form of a YES or NO, as to whether the given alarm was a genuine representation of an operating anomaly. By incorporating such feedback into a knowledge base, the monitoring system may learn from all generated alarms, such that for metrics in a given cluster, similar alarms are not duplicated, and that even for the same metric, alarms with similar characteristics are not raised more than once if they are tagged as false.

Figure 1:
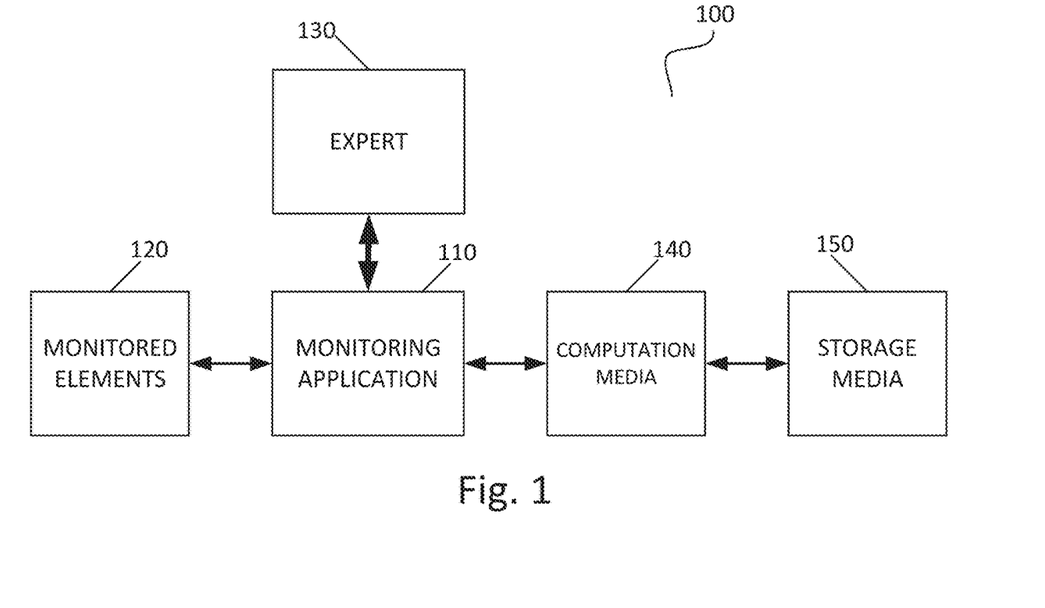
FIG. 1 illustrates an example block diagram of a system, according to one embodiment.

FIG. 1 illustrates an example block diagram of a system 100, according to one embodiment. As illustrated in the example of FIG. 1, the system 100 may include a monitoring application 110 configured to collect data from network elements 120 on one or more metrics. In an embodiment, monitoring application 110 may also be configured to generate and/or send alarms to an expert 130 when the observed values of the collected data are outside of the set baselines. The expert 130 may interact with the monitoring application 110 by providing feedback on the validity of the generated alarms. The system 100 may further include readable and writable storage media 150 for storing the processed metric data and/or several computer programs that implement the logic of the methods described herein. In one embodiment, the system 100 may include at least one computation media or processor 140 on which the logic of the methods described herein are run. The monitored elements 120, monitoring application 110, computation media 140 and storage media 150 may be physical or virtual elements, and may be separate elements (e.g., connected by application programming interfaces (APIs)) or may reside on the same server.

Figure 2:
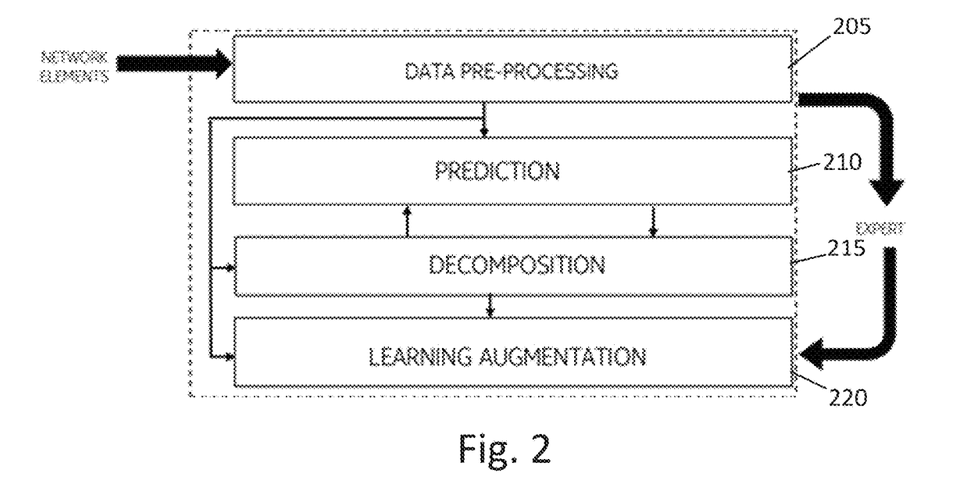
FIG. 2 illustrates a block diagram of a process, according to an embodiment.

FIG. 2 illustrates a block diagram depicting the steps of a process according to an embodiment. In an embodiment, the process steps of FIG. 2 may be performed by system 100 depicted in FIG. 1 including, for example, monitoring application 110 and computation media (e.g., processor) 140. As illustrated in FIG. 2, the process may be accomplished in at least four steps that include data pre-processing 205, prediction 210, decomposition 215, and learning augmentation 220. Embodiments may also include an interaction between the four blocks of FIG. 2, interaction with the network monitoring application 110 that is configured to collect data from network elements and provide it to the pre-processing block 205, and optionally interaction with an expert who may receive a notification of generated alarms and provide feedback regarding the alarms.

Data pre-processing 205 may include a number of data pre-processing techniques, such as data aggregation and normalization. Aggregation is motivated by the understanding that the monitored metrics' values are influenced by traffic carried by the network. Since deterministic variations in traffic may be expected at time scales larger than one hour (based on practical experience and the concept of "busy hour traffic" in telecommunications), aggregation may include averaging observed values to obtain hourly averages. The aggregation may also minimize the stochastic variations in the metric values. This, however, does not preclude other aggregation time scales.

Since some monitored (and hence average) values may have very large magnitudes, it is desirable to rescale the input data into a uniform range. This may be necessary for many analytics and machine learning approaches such as neural networks, which are sensitive to the scale of input data. One non-limiting example of a normalization approach involves transforming observed values into one where the mean is approximately 0 while the standard deviation is in a range close to 1. This ensures that the prediction process focuses on structural similarities/dissimilarities rather than on the amplitude.

The prediction step 210 may take as input sequential observations covering a given period (e.g., one week) from the pre-processing step for each metric of a given element, and may output the predicted observations for the same metric for a given future period (e.g., one week). In other words, the prediction 210 may obtain observations over the past week, and may output predictions for the proceeding week. To this end, the prediction 210 may include a method that (to be generalizable across a wide range of metrics) applies a machine learning-based approach or algorithm. One example for this purpose may utilize long short-term memory (LSTM) structure of neural networks. However, any other machine learning approach may be used. Any such algorithm or model may be trained by use of historical data. The prediction process 210 may run both periodically and iteratively to make predictions for each metric. In an embodiment, a final output of the prediction step 210 may be post-processed to reverse the normalization that may be performed in the data pre-processing step 205. For example, in one embodiment, the final output of the prediction step 210 may be post-processed according to the following formula, where $y^t_{me}$ are the predicted values:

$$y_{me}^t = (y_{me}^t \times \text{standard deviation}(X)) + \text{mean}(X)$$

The decomposition step 215 may serve two objectives including generating the network baselines for each metric, and continuously adapting these baselines to changes in network conditions. To achieve these two objectives, decomposition 215 may perform a decomposition of the observations for a given metric over a given period into its trend and variability (or noise) using approaches, such as time series decomposition.

To translate the predictions into network baselines, decomposition step 215 may determine the variability of the observations for any given metric. To this end, the noise component of decomposed observations may be used. Since machine learning prediction approaches, such as neural networks, are trained to generalize to map inputs to outputs, their predictions would generally try to eliminate noise. Therefore, the noise may be used as a measure of a metric's normal variation from the predicted values to create lower and upper limits. The standard deviation ($\sigma_{me}$) of the decomposed noise may be determined as the maximum allowed deviation above and below the predicted values, so as to result in the network operating baselines. As one example, observations of each metric may be decomposed into three additive components such that $x^t_{me} = r^t_{me} + s^t_{me} + n^t_{me}$, where $r^t_{me}$, $s^t_{me}$, and $n^t_{me}$ are the trend, seasonal, and noise components, respectively. The trend $r^t_{me}$ may be determined as a centered weighted moving average of order k+1 with k=168 (assuming one week observation period) according to the following formula:

$$r^t_{me} = \sum_{j=-n}^{n} c_j \times x^{t+j}_{me} \; \forall\, m \in M, \epsilon \in E, t \in T,$$

where n=k/2 and all observations take weight $c_j$ given by 1/k except the first and last observations where the weights $c_{-n}$ and $c_n$ are given by ½k. In an embodiment, the baseline(s) may be updated every time the prediction model for a given metric is updated based on the adaptation described below. In an embodiment, a predicted lower boundary $l^t_{me}$ and upper boundary $u^{me}_t$, for each metric may be determined according to the following formulas:

$$l_{me}^t = y_{me}^t - \sigma_{me} \forall m \in M, e \in E, t \in T$$

$$u_{me}^t = y_{me}^t - \sigma_{me} \forall m \in M, e \in E, t \in T$$

In order to minimize the time needed to generate predictions and hence ensure real-time predictions, after every prediction, the generated prediction model may be stored in memory for use with future predictions for the same metric. However, to ensure that the prediction models remain accurate as the network evolves (i.e., to take into consideration changes in traffic trend, or network topology and component), adaptation may involve pro-actively checking whether the trend of observations of a given metric has changed (e.g., from increasing to decreasing, constant to increasing, etc.) since the last prediction model was created. To this end, in an embodiment, periodically (e.g., every week) the decomposition step 215 may include determining the slope of the trend for each metric. A positive value for the slope represents an increasing trend, while a negative value represents a decreasing trend. To determine changes in the trend for an observed metric, the decomposition step 215 keeps track of these slopes over time and compares the current slope with the previous one. When the slope changes from being positive to negative (or from negative to positive), a change in the trend is detected, which triggers an adaptation of the prediction model with the latest data for the metric under consideration. In one embodiment, there may be an additional consideration for adapting a prediction model to a change in trend, such that if a detected change in trend leads to a breach of the currently set baselines, then the adaptation is performed if it is confirmed from an expert or its knowledge base that the breach was a not a result of an anomaly. This embodiment is aimed at avoiding that the model is re-created from anomalous observations.

When an observed value for any metric is outside the upper and lower baselines set, the system may detect this as a breach. An objective of the learning augmentation component 220 is to facilitate a mechanism where an expert augments the predicted baselines by providing feedback when an alarm is raised so that the system learns from all the alarms it raises. Learning augmentation 220 may then use this information in deciding whether to raise future alarms or not. Considering that the behaviour of many metrics in each network may be similar (for example, the CPU utilization of two nodes may have similar magnitudes as well as peak and trough at the same times since traffic in the network would affect them in the same saw), learning augmentation 220 may be configured to ensure that alarms raised for a given metric may be used as a basis to learn to make future decisions regarding "similar" metrics. To achieve these objectives, the learning augmentation 220 may be composed of three sub-systems: (1) knowledge base, (2) alarm generation, and (3) metric clustering, as described in the following.

Figure 3:
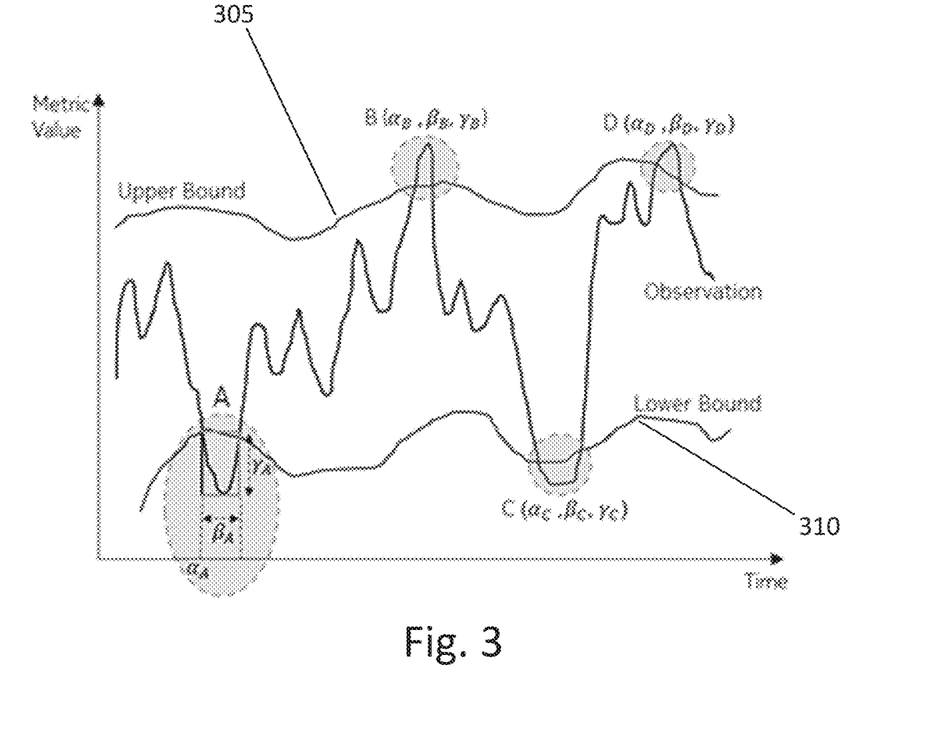
FIG. 3 illustrates a graph depicting an example of baseline breach modelling, according to an embodiment.

According to an embodiment, the Knowledge Base (KB) may contain records of all breaches that have happened in the past and/or feedback from an expert. Information stored in the KB may be used as a basis for making decisions on whether alarms should be generated or not after a breach has been detected. FIG. 3 illustrates an example of baseline breach modelling showing how breaches may be converted into entries into the KB. Specifically, the example of FIG. 3 depicts a metric with four breaches A, B, C and D. In this example, each breach may be modelled as a 3-tuple with parameters α, β and γ, where α is the time period when the breach occurred, β is the duration of the breach, and γ is the maximum magnitude of the breach. This information may be stored in the KB together with the response from an expert for each metric cluster. In one embodiment, before any alarm is generated, the KB may be checked to confirm that the current breach does not exist in the KB for the cluster under consideration. According to some embodiments, a breach may be considered to be similar to another if its value of α falls within the same time range (e.g., from 0000 hrs to 0600 hrs), β is less, and γ is less than the corresponding values for an existing entry in the knowledge base for items in the same cluster.

In an embodiment, for each metric, the system may continuously compare actual observations to its baseline so as to establish whether the observations represent a breach of the operating bounds, i.e., if the observed value is either higher than the upper bound 305 or lower than the lower bound 310 of the set baseline. When a breach is detected, a decision should be made on whether to raise an alarm or not. Therefore, not all breaches to set baselines result in an alarm being raised. In order to make this decision, one embodiment uses the KB. For example, when a breach is detected, it is first checked whether the metric under consideration has an entry in the KB. If no entry is found, then an alarm is generated and a new entry is created in the KB filling in the available values (such as metric identification and α), and waiting until when the other values (such as β and γ) become available to update them. When a domain expert (e.g., network administrator) receives the alarm, they are asked to respond with a YES or NO answer on whether this breach represents an anomaly or not. On the other hand, if after a breach a given metric already has at least one entry in the KB, the current breach is evaluated against all existing entries in the KB to establish similarity. According to this embodiment, each of the three parameters of the current breach may be compared against the corresponding parameters for each of the existing entries for that metric. As one example, considering that (α', β', γ') and (α", β", γ"), are the KB parameters for each of the existing entries and current observation respectively, if α'=α" AND β'≤β" AND γ'≤γ" for any of the existing entries, and the anomaly column for the same is "NO", then no alarm is generated.

Many elements in a given network may be affected in a similar way by network dynamics. For example, Virtual Network Functions (VNFs) in a service function chain, which processes packets in a sequential manner, would be expected to have ebbs and flows in the observations of their metrics such as CPU and bandwidth occurring at almost the same time. This means that the CPU utilization of two VNFs hosted in adjacent nodes would have similar magnitudes, as well as have peaks and troughs at similar times. In such a case, when one of the nodes breaches its set baseline for a given metric (e.g., CPU), it is very likely that a breach will also occur in an adjacent one. For this reason, one embodiment may also include a method that groups metrics such that alarm generation is based on metric clusters rather than individual metrics. According to this embodiment, each metric may be attached to a cluster (a cluster may have 1 or more metrics), and the rules in the KB are stored based on cluster identifiers (IDs) rather than on individual metric IDs. Then, when a breach occurs, the search for entries in the KB may be performed for the cluster in which the current metric is contained.

Clustering metrics can serve at least two purposes. First, Since KB entries are grouped, it reduces the number of entries that must be kept in the KB. Second, it reduces the number of false alarms that may be presented to an expert since, for a given metric cluster, a given breach is responded to once. To cluster metrics, an embodiment is configured to find the alignment between the observations of all the metric observations over a given time period. This can be done using approaches like time series analysis (such as dynamic time warping) or machine learning (such as k-means or Bayesian inference) methods. Using the alignment between metrics, a numerical value that provides a measure of similarity between all metrics is determined. Any two or more metrics are clustered together if the similarity distances between them is less than a set constant.

Figure 4A:
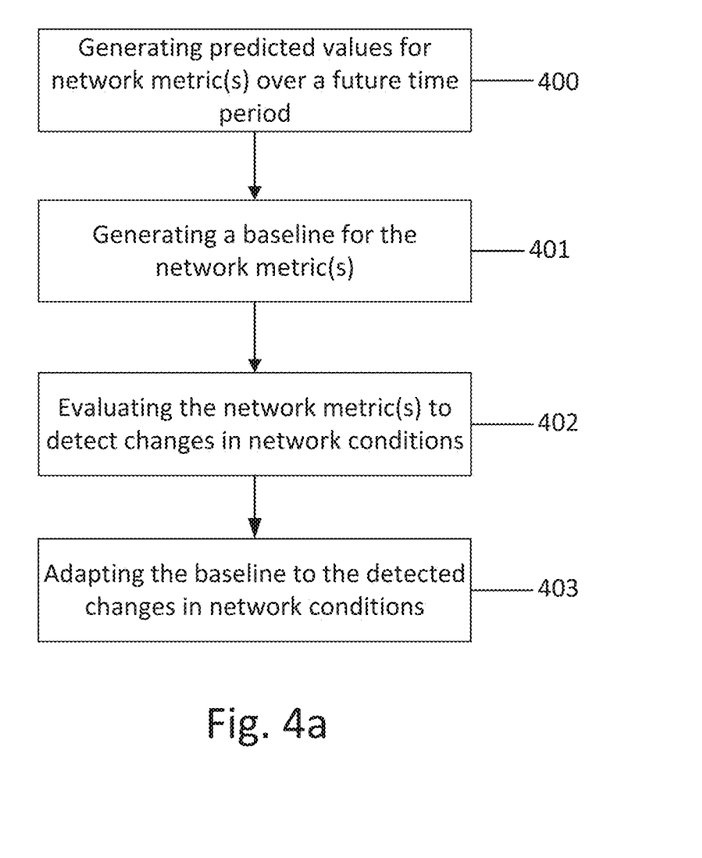
FIG. 4a illustrates a flow diagram of a method, according to one embodiment.

FIG. 4a illustrates an example process flow diagram of a method for generating and adapting network baselines, according to one embodiment. The method of FIG. 4a may be performed by a network element or network node, such as a router, switch, access point, base station, radio network controller, node B, evolved node B (eNB), 5G node B (gNB), next generation node B (NG-NB), WLAN access point, mobility management entity (MME), serving gateway (SGW), application server or subscription server or the like.

As illustrated in the example of FIG. 4a, the method may include, at 400, calculating or generating predicted values for one or more network metric(s) over a future time period. The generating 400 may include generating the predicted values using historic data, a machine learning and/or time series analysis technique. According to one embodiment, the predicted values may be periodically generated. In one embodiment, the method may include storing the predicted values in memory for use with future predictions of the metric(s).

In an embodiment, the method may also include, at 401, generating a baseline for the network metric(s) using the predicted values and/or the historic data. The baseline may indicate or include an upper limit and/or a lower limit for the network metric(s), for example, as shown in the example of FIG. 3 discussed above. The method may further include, at 402, evaluating the network metric(s) to detect changes in network conditions using, for example, at least one time series analysis technique. In an embodiment, the network metric(s) may be continuously or periodically evaluated. The method may then include, at 403, changing or adapting the baseline to the detected changes in network conditions using the historic data, machine learning and/or time series analysis technique. The adapting 403 of the baseline may include periodically determining a trend for the at least one network metric and modifying the baseline when a change in the trend is detected.

In one embodiment, the method may also include determining a variability from the predicted values of the network metric(s) over the future time period using at least one time series analysis technique. According to some embodiments, the method may also include comparing a currently observed value of the network metric(s) with the baseline, and detecting a breach when the currently observed value of the network metric(s) is above the upper limit of the baseline or below the lower limit of the baseline. In certain embodiments, the method may also include storing each past detected breach of the baseline as a record in a KB. As depicted in FIG. 3 discussed above, each record in the KB may include a time period when the breach occurred, a duration of the breach, and/or a maximum magnitude of the breach.

In an embodiment, when a breach is detected, the method may include checking the KB to determine whether there is a similar breach to the detected breach that is stored in the KB. When no similar breach is found in the KB, then the method may include generating an alarm and creating a new record in the KB for the detected breach. When a similar breach is found in the KB, then the method may include monitoring the network metric(s) that caused the breach for adherence to the record of the similar breach to confirm that the detected breach does not represent an anomaly in the network.

According to certain embodiments, when an alarm is generated, the method may include sending the alarm to a network administrator, receiving a response indicating whether the breach that triggered the alarm represents an anomaly in the network, and updating the knowledge base to store the response in the record of the breach. In some embodiments, the method may also include assigning the network metric(s) to a cluster according to an alignment between metrics, and grouping records in the KB based on the cluster.

Figure 4B:
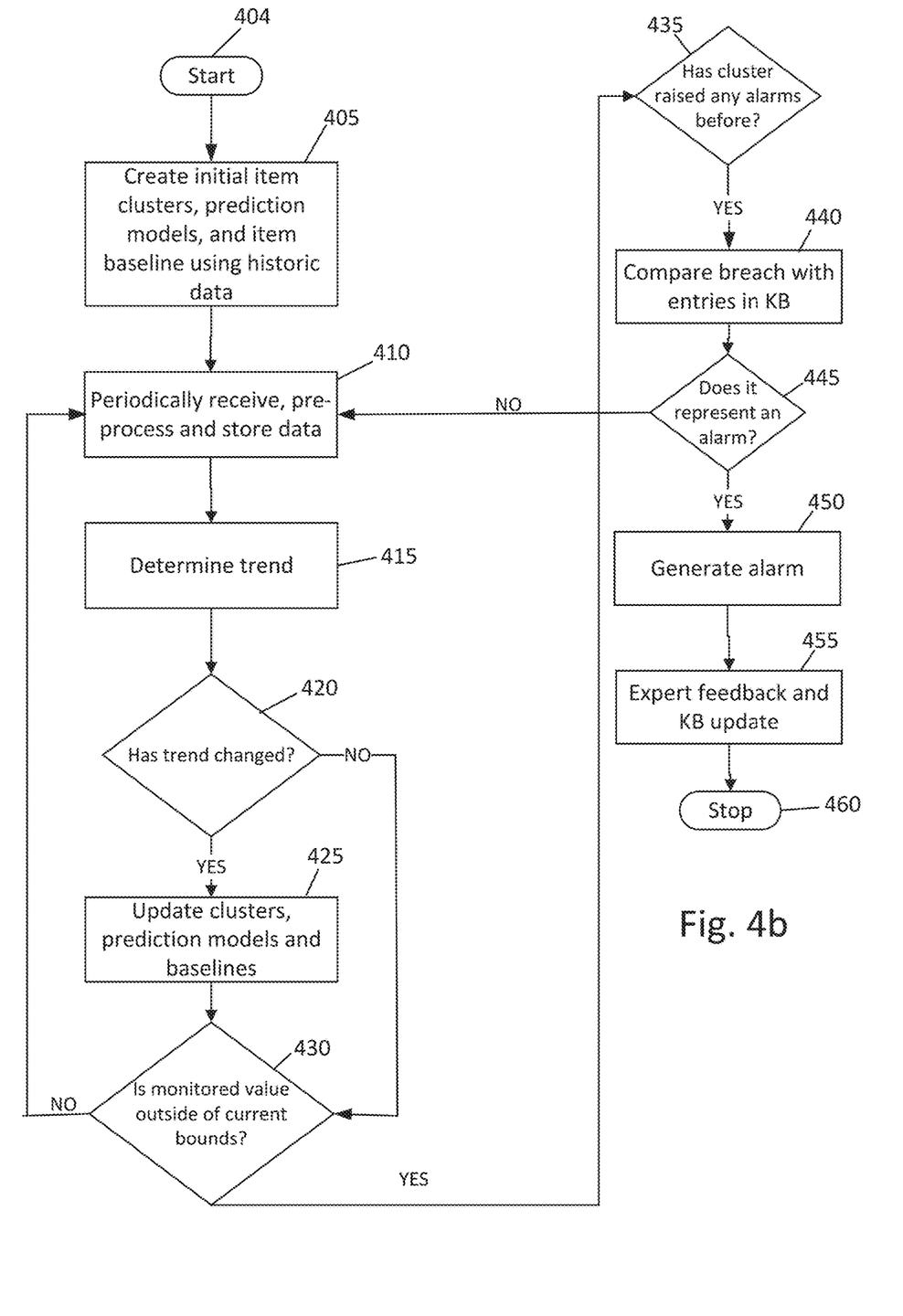
FIG. 4b illustrates a flow diagram of a method, according to another embodiment.

FIG. 4b illustrates an example process flow diagram of a method, according to another embodiment. As illustrated in FIG. 4b, the method begins at 404 and, at 405, historical data may be used to generate an initial set of metric clusters, prediction models, and metric baselines, for example, as depicted in FIG. 4a. These may be used by the system until either a new metric has to be incorporated or a change in trend is detected. The following steps may be performed for each metric.

Continuing with FIG. 4b, periodically, a metric may be monitored, and the received data may be pre-processed and stored in a database or memory, at 410. The most recent trend of observations may be determined at 415. The determined trend may be compared with the previous trend to determine if there is a change in trend at 420. If a change in trend is detected, the metric's membership to any cluster is re-evaluated. The result of this evaluation may lead, at 425, to remaining in the same cluster, joining a different cluster, or starting a new cluster. In addition, at 425, the prediction model & baselines for the metric may be updated using the most recent observations. On the other hand, if the trend has not changed, the observed value may be compared against the current baseline at 430, and if it is within the set bounds, then the system waits to make the next observation. If the monitored value is outside of the set bounds, at 440, the KB may be checked for existence of entries for the cluster into which the metric belongs. If no entry exists, an entry may be created and an alarm generated at 450. If at least one entry is found at 440, the metric is closely monitored for adherence to all the such entries in the KB until it is confirmed that it either does not represent an anomaly at 445, or that it does, in which case an alarm is generated at 450. Finally, when an alarm is generated at 450, the KB may be updated and a response from an expert may be incorporated at 455. The process may then end at 460.

Figure 5:
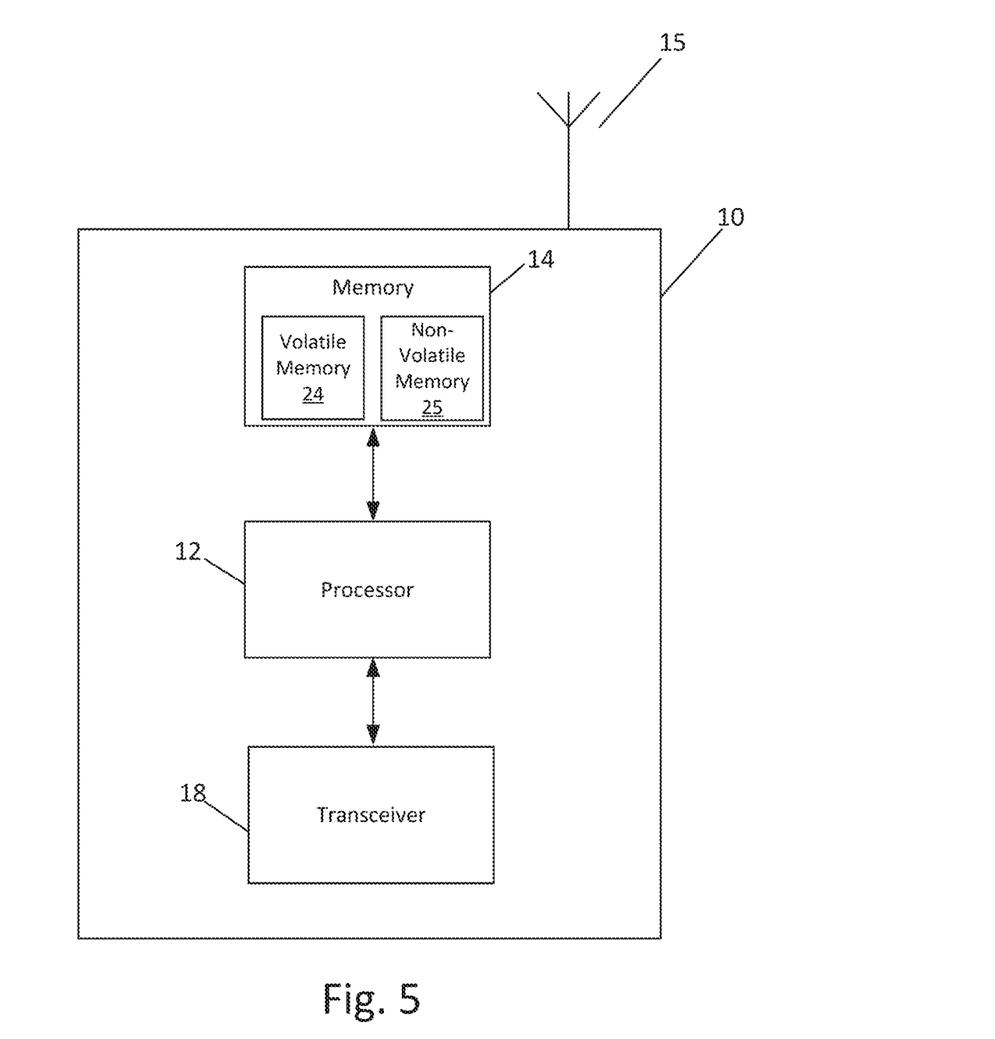
FIG. 5 illustrates a block diagram of an apparatus, according to an embodiment.

FIG. 5 illustrates an example of an apparatus 10 according to an embodiment. In an embodiment, apparatus 10 may be a node, host, or server in a communications network or serving such a network. For example, apparatus 10 may be a router, switch, access point, base station, radio network controller, node B, evolved node B (eNB), 5G node B (gNB), next generation node B (NG-NB), WLAN access point, mobility management entity (MME), serving gateway (SGW), application server or subscription server associated with a radio access network, such as a UMTS network, LTE network or 5G radio access technology. It should be noted that one of ordinary skill in the art would understand that apparatus 10 may include components or features not shown in FIG. 5.

As illustrated in FIG. 5, apparatus 10 may include a processor 12 for processing information and executing instructions or operations. Processor 12 may be any type of general or specific purpose processor. While a single processor 12 is shown in FIG. 5, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may include volatile memory 24 and/or non-volatile memory 25. Therefore, memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, volatile memory 24 may include random access memory (RAM), such as dynamic or static RAM. Non-volatile memory 25 may include, for example, read only memory (ROM), flash memory, and/or mechanical disks, such as hard disks or optical disks. Thus, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory 14 may also store one or more functional modules, such as an application or program, to provide additional functionality for apparatus 10. For example, in an embodiment, memory 14 may store a monitoring application, such as the monitoring application 110 illustrated in FIG. 1. It is noted that the components of apparatus 10 may be implemented in hardware, or as any suitable combination of hardware and software.

In one embodiment, apparatus 10 may be a network node, network element or server, as discussed above. According to certain embodiments, apparatus 10 may be controlled by memory 14 and processor 12 to perform the functions associated with any of the embodiments described herein. For example, in some embodiments, apparatus 10 may be controlled by memory 14 and processor 12 to perform at least any of the methods or block diagrams illustrated in FIGS. 1-4.

According to an example embodiment, apparatus 10 may be controlled by memory 14 and processor 12 to calculate or generate predicted values for one or more network metric(s) over a future time period. The predicted values may be calculated, for example, by using historic data, a machine learning and/or time series analysis technique. According to one embodiment, the predicted values may be periodically generated and/or may be stored in memory for use with future predictions of the metric(s).

In an embodiment, apparatus 10 may be controlled by memory 14 and processor 12 to determine or generate a baseline for the network metric(s) using the predicted values and/or the historic data. The baseline may indicate or include an upper limit and/or a lower limit for the network metric(s), for example, as shown in the example of FIG. 3 discussed above. In some embodiments, apparatus 10 may also be controlled by memory 14 and processor 12 to assess or evaluate the network metric(s) to detect changes in network conditions using, for example, at least one time series analysis technique. In an embodiment, the network metric(s) may be continuously or periodically evaluated. According to an embodiment, apparatus 10 may be controlled by memory 14 and processor 12 to change or adapt the baseline to the detected changes in network conditions using the historic data, machine learning and/or time series analysis technique. In one embodiment, apparatus 10 may be controlled by memory 14 and processor 12 to change or adapt the baseline by periodically determining a trend for the at least one network metric and/or modifying the baseline when a change in the trend is detected.

According to an embodiment, apparatus 10 may be controlled by memory 14 and processor 12 to determine a variability from the predicted values of the network metric(s) over the future time period using at least one time series analysis technique. In some embodiments, apparatus 10 may be controlled by memory 14 and processor 12 to compare a currently observed value of the network metric(s) with the baseline, and to detect a breach when the currently observed value of the network metric(s) is above the upper limit of the baseline or below the lower limit of the baseline. In certain embodiments, apparatus 10 may be controlled by memory 14 and processor 12 to store each past detected breach of the baseline as a record in a KB. As depicted in FIG. 3 discussed above, each record in the KB may include a time period when the breach occurred, a duration of the breach, and/or a maximum magnitude of the breach.

In an embodiment, when a breach is detected, apparatus 10 may be controlled by memory 14 and processor 12 to check the KB to determine whether there is a similar breach to the detected breach that is stored in the KB. As discussed in detail above, a breach may be considered to be similar to another if the time periods when the breaches occurred falls within the same time range (e.g., from 0000 hrs to 0600 hrs), and the duration and maximum magnitude are less than the corresponding values for an existing entry in the KB.

When no similar breach is found in the KB, then apparatus 10 may be controlled by memory 14 and processor 12 to generate an alarm and create a new record in the KB for the detected breach. When a similar breach is found in the KB, then apparatus 10 may be controlled by memory 14 and processor 12 to monitor the network metric(s) that caused the breach for adherence to the record of the similar breach to confirm that the detected breach does not represent an anomaly in the network.

According to certain embodiments, when an alarm is generated, apparatus 10 may be controlled by memory 14 and processor 12 to send the alarm to a network administrator or expert, to receive a response from the network administrator/expert indicating whether the breach that triggered the alarm represents an anomaly in the network, and to update the knowledge base to store the response in the record of the breach. In some embodiments, apparatus 10 may be controlled by memory 14 and processor 12 to assign the network metric(s) to a cluster according to an alignment between metrics, and to group records in the KB based on the cluster.

Therefore, embodiments of the invention provide several technical improvements, enhancements, and/or advantages. For example, as a result of certain embodiments, networks are able to be better monitored in real-time. Hence, the reliability, availability, and/or operational efficiency of networks and their nodes is ensured and improved. In addition, certain embodiments can reduce the number of false alarms and limit the load on network administrators. As such, embodiments of the invention can improve performance and throughput of networks and network nodes including, for example, access points, base stations/eNBs/gNBs, and mobile devices or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:
1. A method, comprising:
generating predicted values for at least one network metric over a future time period, wherein the generating comprises using at least one of historic data, a machine learning or time series analysis technique;
generating a baseline for the at least one network metric using at least one of the predicted values or the historic data, wherein the baseline comprises an upper limit and a lower limit;
evaluating the at least one network metric to detect changes in network conditions using the time series analysis technique;
adapting the baseline to the detected changes in network conditions using the at least one of historic data, machine learning or time series analysis technique;
comparing a currently observed value of the at least one network metric with the baseline;
detecting a breach when the currently observed value of the at least one network metric is above the upper limit of the baseline or below the lower limit of the baseline; and
storing each past detected breach of the baseline as a record in a knowledge base, wherein the record comprises at least one of a time period when the breach occurred, a duration of the breach, or a maximum magnitude of the breach.

2. The method according to claim 1, further comprising:
determining a variability from the predicted values of the at least one network metric over the future time period using the time series analysis technique.

3. The method according to claim 1, wherein the adapting of the baseline comprises periodically determining a trend for the at least one network metric and modifying the baseline when a change in the trend is detected.

4. The method according to claim 1, wherein, in response to detecting a breach, the method further comprises:
checking the knowledge base to determine whether there is a similar breach to the detected breach that is stored in the knowledge base;
in response to no similar breach being found in the knowledge base, generating an alarm and creating a record in the knowledge base for the detected breach; and
in response to a similar breach being found in the knowledge base, monitoring the at least one network metric that caused the breach for adherence to the record of the similar breach to confirm that the detected breach does not represent an anomaly in a network.

5. The method according to claim 4, wherein, in response to an alarm being generated, the method further comprises:
sending the alarm to a network administrator;
receiving a response indicating whether the breach that triggered the alarm represents an anomaly in the network; and
updating the knowledge base to store the response in the record of the breach.

6. The method according to claim 1, further comprising:
assigning the at least one network metric to a cluster according to an alignment between metrics; and
grouping records in the knowledge base based on the cluster.

7. The method according to claim 1, further comprising:
storing the predicted values in memory for use with future predictions of the at least one network metric.

8. An apparatus, comprising:
at least one processor; and
at least one memory comprising computer program code;
the at least one memory and computer program code configured, with the at least one processor, to cause the apparatus at least to:
generate predicted values for at least one network metric over a future time period, wherein the generating comprises using at least one of historic data, a machine learning or time series analysis technique;
generate a baseline for the at least one network metric using at least one of the predicted values or the historic data;
evaluate the at least one network metric to detect changes in network conditions using the time series analysis technique;
adapt the baseline to the detected changes in network conditions using the at least one of historic data, machine learning or time series analysis technique;
compare a currently observed value of the at least one network metric with the baseline;
detect a breach when the currently observed value of the at least one network metric is above the upper limit of the baseline or below the lower limit of the baseline; and
store each past detected breach of the baseline as a record in a knowledge base, wherein the record comprises at least one of a time period when the breach occurred, a duration of the breach, or a maximum magnitude of the breach.

9. The apparatus according to claim 8, wherein the at least one memory and computer program code are further configured, with the at least one processor, to cause the apparatus at least to:
determine a variability from the predicted values of the at least one network metric over the future time period using the time series analysis technique.

10. The apparatus according to claim 8, wherein, to adapt the baseline, the at least one memory and computer program code are further configured, with the at least one processor, to cause the apparatus at least to periodically determine a trend for the at least one network metric and modify the baseline when a change in the trend is detected.

11. The apparatus according to claim 8, wherein, in response to a breach being detected, the at least one memory and computer program code are further configured, with the at least one processor, to cause the apparatus at least to:
check the knowledge base to determine whether there is a similar breach to the detected breach that is stored in the knowledge base;
in response to no similar breach being found in the knowledge base, generate an alarm and create a record in the knowledge base for the detected breach; and
in response to a similar breach being found in the knowledge base, monitor the at least one network metric that caused the breach for adherence to the record of the similar breach to confirm that the detected breach does not represent an anomaly in a network.

12. The apparatus according to claim 11, wherein, in response to an alarm being generated, the at least one memory and computer program code are further configured, with the at least one processor, to cause the apparatus at least to:
send the alarm to a network administrator;
receive a response indicating whether the breach that triggered the alarm represents an anomaly in the network; and
update the knowledge base to store the response in the record of the breach.

13. The apparatus according to claim 8, wherein the at least one memory and computer program code are further configured, with the at least one processor, to cause the apparatus at least to:

assign the at least one network metric to a cluster according to an alignment between metrics; and group records in the knowledge base based on the cluster.

14. The apparatus according to claim 8, wherein the at least one memory and computer program code are further configured, with the at least one processor, to cause the apparatus at least to:

store the predicted values in memory for use with future predictions of the at least one network metric.

15. The apparatus according to claim 8, wherein the predicted values are periodically generated, and wherein the at least one network metric is continuously evaluated to detect changes in the network conditions.

16. A computer program embodied on a non-transitory computer readable medium, wherein the computer program, when executed by a processor, causes the processor to perform a process, comprising:

generating predicted values for at least one network metric over a future time period, wherein the generating comprises using at least one of historic data, a machine learning or time series analysis technique;

generating a baseline for the at least one network metric using at least one of the predicted values or the historic data, wherein the baseline comprises an upper limit and a lower limit;

evaluating the at least one network metric to detect changes in network conditions using the time series analysis technique;

adapting the baseline to the detected changes in network conditions using the at least one of historic data, machine learning or time series analysis technique;

comparing a currently observed value of the at least one network metric with the baseline;

detecting a breach when the currently observed value of the at least one network metric is above the upper limit of the baseline or below the lower limit of the baseline; and storing each past detected breach of the baseline as a record in a knowledge base, wherein the record comprises at least one of a time period when the breach occurred, a duration of the breach, or a maximum magnitude of the breach.

\* \* \* \* \*